Nov. 1, 1938.  R. T. STEINDORF ET AL  2,135,442
SCUMMING APPARATUS FOR LIQUIDS
Filed Aug. 13, 1935  2 Sheets-Sheet 2
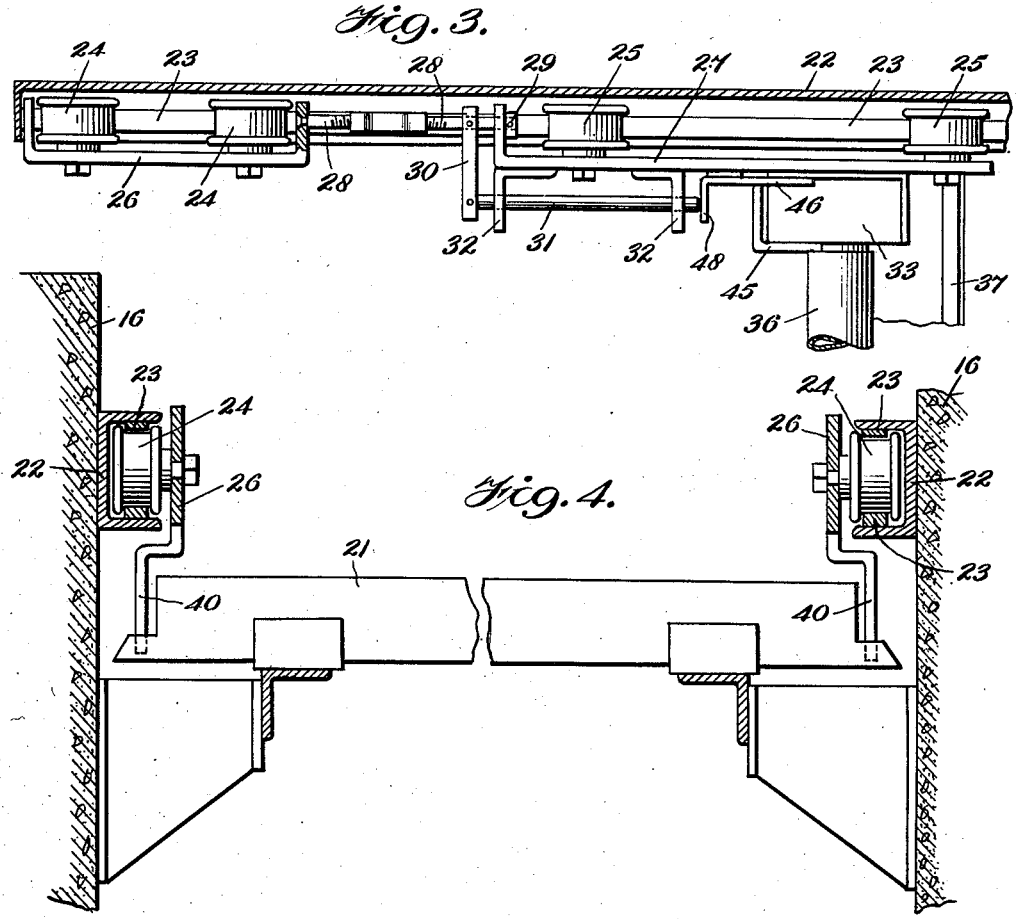
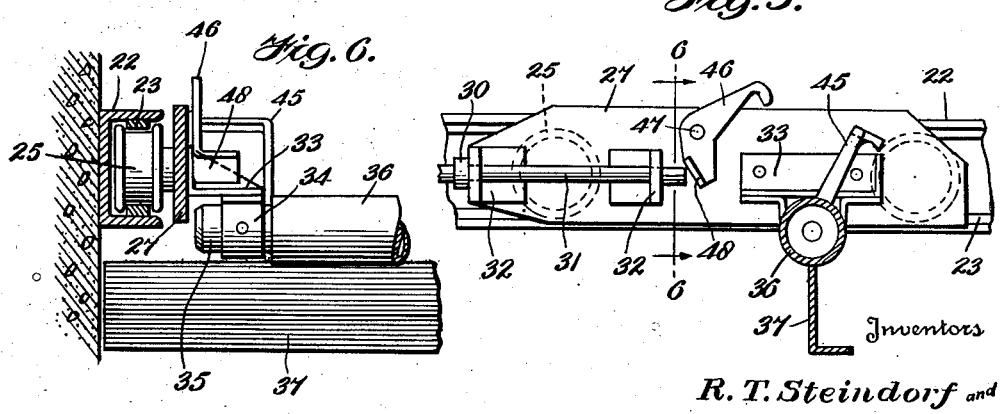
Inventors
R. T. Steindorf and
A. C. Lind,
By Barker & Collins
Attorneys Patented Nov. 1, 1938

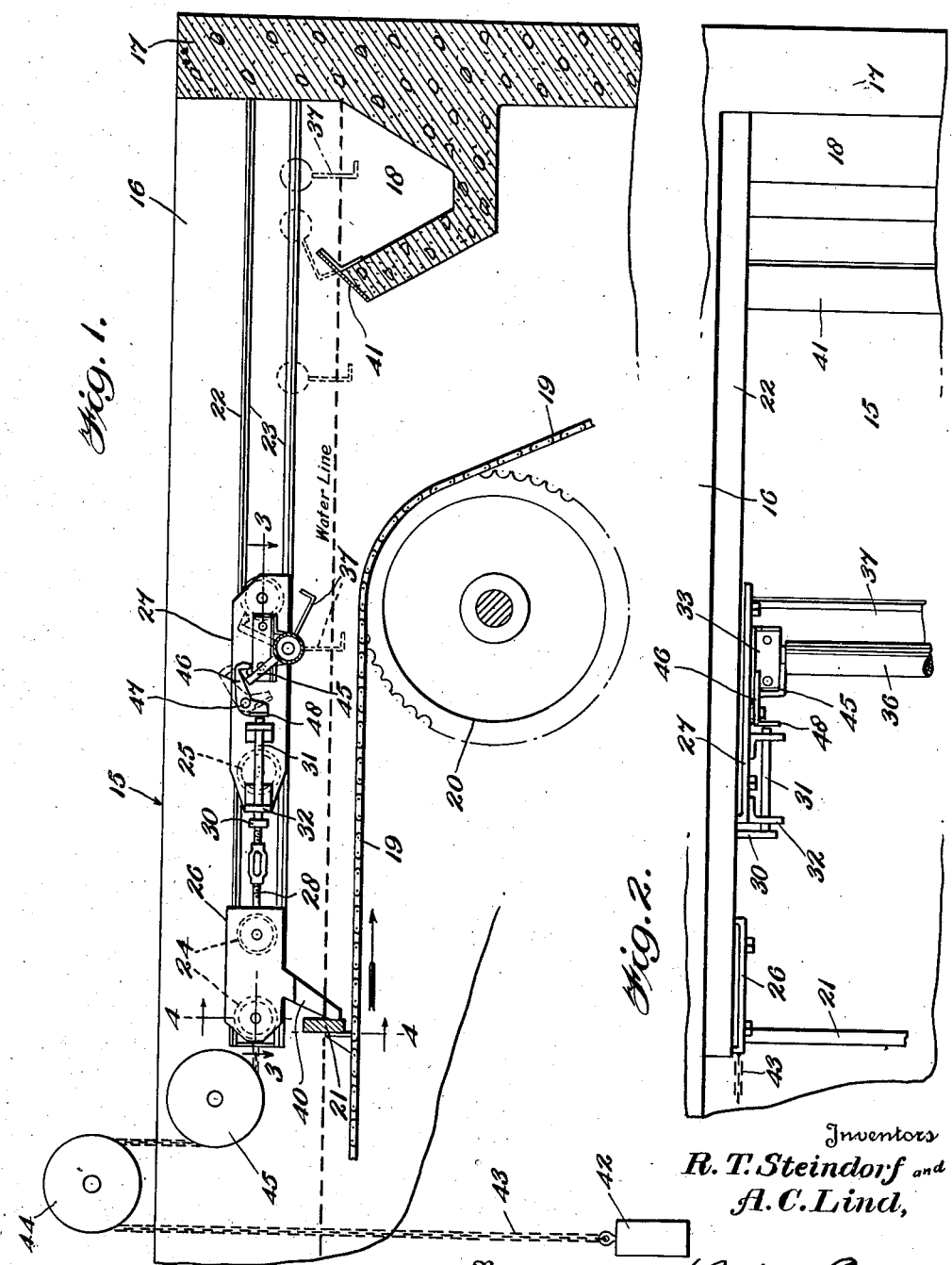

2,135,442

UNITED STATES PATENT OFFICE 2,135,442

SCUMMING APPARATUS FOR LIQUIDS

Robert T. Steindorf and Arthur C. Lind, Milwaukee, Wis., assignors to Chain Belt Company, Milwaukee, Wis., a corporation of Wisconsin Application August 13, 1935, Serial No. 36,016

5 Claims. (Cl. 210—55)

This invention relates to scumming apparatus for liquids, and has for one of its objects to provide mechanism of this character which will be simple in construction, comparatively inexpensive to manufacture and install, and more efficient in use than those which have been heretofore proposed.

Certain types of sedimentation tanks which are widely used in liquid separation and purification work, are provided with means for removing the settled solids comprising endless conveyers having scraper flights which pass along the floor of the tank, working the sludge to a sump from which it may be drawn off by appropriate means. The present invention has for a further object to provide means for removing the scum and other matter which is too light to settle, from the surface of the liquid in such a tank, and comprises a scummer blade or flight mounted for travel at the liquid surface so as to sweep the same, which blade is moved through driving members positioned in the path of the sludge-removing flights.

With the above and other objects in view, which will appear as the description proceeds, the invention consists in the novel details of construction, and combinations of parts, more fully hereinafter described, and particularly pointed out in the appended claims.

Referring to the accompanying drawings forming a part of this specification in which like reference characters designate like parts in all the views:—

Figure 1 is a vertical sectional view through a portion of a settling tank of the type above described, and showing associated therewith one form of scumming apparatus constructed in accordance with the present invention;

Fig. 2 is a top plan view of the parts shown in Fig. 1;

Fig. 3 is an enlarged horizontal sectional view, taken approximately on the plane indicated by the line 3—3 of Fig. 1, looking down;

Fig. 4 is an enlarged transverse sectional view, taken approximately on the plane indicated by the line 4—4 of Fig. 1, looking in the direction of the arrows;

Fig. 5 is an enlarged elevational sectional view of one of the carriage members, showing the scummer blade in its effective position; and Fig. 6 is a transverse sectional view, taken approximately on the plane indicated by the line 6—6 of Fig. 5.

Referring more particularly to the said drawings, 15 indicates a settling tank, here shown for purposes of disclosure only, as being of a type commonly employed in sewage disposal work and provided with side walls 16 and an end wall 17, which latter is in turn provided with a scum trough or receptacle 18. The said tank is also provided with the well-known type of sludge removing conveyor comprising endless chains 19 trained about suitably disposed sprockets, one of which is shown at 20, and provided with sludge removing scrapers or flights 21. The upper run of the sludge conveyor is preferably disposed adjacent the water level so that the flights 21 will break the surface of the liquid as they move from left to right as viewed in Fig. 1 and thereby serve to push the scum and other floating debris toward the scum trough as is common practice in this type of apparatus.

As will be clear from Fig. 1, the said flights 21 will not move the scum and debris completely to the trough 18 before they pass around the sprocket 20 and move downwardly to the floor of the tank and in order to complete the movement of the debris to the trough additional scumming means are provided. That is to say, upon each of the walls 16 at this end of the tank and somewhat above the liquid level there is secured the channel members 22 to the upper and lower flanges of which are secured straps 23 constituting guiding tracks for the wheels or rollers 24 and 25 of the tandem carriage members 26 and 27. These said carriage members are connected together by a lost motion connection best shown in Figs. 1 and 3, comprising an adjustable rod 28 rigidly secured to the frame of carriage 26 and slidably engaging the frame member of carriage 27. Said rod 28 may be provided with a collar 29 or other suitable stop member to limit its movement relative to the carriage 27 toward the left as viewed in Figs. 1 and 3, and said rod is further provided with a rigid arm 30 which extends laterally and rigidly carries a push rod 31 slidably passing through guides 32 carried by the frame member of carriage 27.

The carriage member 27 is provided with a bracket 33 to which is secured a suitable bearing 34 journalling a stud 35 rigid with a hollow shaft or tube 36 to which is welded or otherwise rigidly secured a scum blade or member 37. The said scum blade is thus pivotally mounted on the carriage members 27 for swinging movements as will be readily understood, and is of such dimensions as to extend somewhat below the water level when in its normal vertical position shown in dotted lines in Fig. 1, to which position it will automatically move under the influence of gravity when not restrained or deflected in the manners which will appear more fully below.

The carriage members 26 are provided with downwardly extended lugs or driving members 40 which are disposed in the path of travel of the sludge conveyor flights 21 and are adapted to be engaged thereby as shown in Figs. 1 and 4, whereby motion of the said flights 21 will be transmitted to the said carriage members 26. When a flight 21 engages the driving members 40 its motion will be transmitted to the carriage members 26 and through the lost motion connection 28 and 30 to the carriage members 27 whereupon the two sets of carriage members will be moved as a unit toward the right as viewed in Fig. 1, carrying the scum blade or member 37 through the successive dotted line positions shown in said figure, with its lower end ultimately engaging and riding up the inclined surface 41 of the scum receptacle 18 and then swinging downwardly after passing the upper edge of this surface to reassume its vertical position as shown in broken lines at the right of Fig. 1. Any scum or debris floating upon the surface of the liquid, and which has been moved to a point above the sprockets 20 by flights 21, will thus be picked up by the scum blade 37 and transferred into the scum trough 18, as will be readily understood.

When the scum blade 37 reaches it farthest position to the right, as shown in Fig. 1, the flight 21 which has been driving it will pass around the sprocket 20 and start downwardly thereby disengaging the driving members 40 whereupon the carriage members 26 and 27 together with the scum blade 37 will be returned toward the left as viewed in Fig. 1 to their initial positions by means of weights 42 connected to the carriage members 26 by chains or cables 43 passing around suitable guiding sprockets 44 and 45, as will be clear from Fig. 1. During this return travel as the scum blade again engages the edge of the inclined member 41 it will be swung in a counter clockwise direction as viewed in Fig. 1, to a point where a latch arm 45 which is rigidly connected to the tubular member 36 will engage with a latch member 46 which is pivoted as at 47 to the frame of the carriage member 27. The scum blade will thus be held in an inclined or elevated position above the water level as shown in full lines in Fig. 1 during its return travel so that it will not move scum and debris toward the left and away from the scum trough during this portion of its movements. The latch member 46 is provided with a laterally extending arm 48 which is disposed within the path of the push rod 31 and when the next succeeding sludge conveyor flight 21 again engages driving lugs 40 to move the carriage members 26 toward the right and take up slack in the lost motion connection 28 the movement thereby imparted to the arm 30 and rod 31 will bring the end of the latter into engagement with the lateral extension 48 of latch member 46 thereby tripping the latch and releasing the scum blade so that it may again assume its vertical position under the influence of gravity and be in position to operatively push the scum and debris to the scum receptacle.

It is obvious that those skilled in the art may vary the precise details of construction as well as the arrangement of parts without departing from the spirit of the invention, and therefore it is not wished to be limited to the above disclosure except as may be required by the claims.

We claim:

1. In a settling tank and the like which is provided with traveling means for moving the settled sludge therein, and with a scum receptacle, the combination of a scummer member mounted for rectilinear movements along the liquid level to and from said receptacle; means engageable by a portion of said sludge-moving means for imparting movement in one direction to said scummer member; and additional means for moving said scummer member in the other direction.

2. In a settling tank and the like which is provided with means for moving the settled sludge therein, and a scum receptacle, the combination of a scummer member, mounted for movements to and from said receptacle; latch means arranged to maintain said member in an ineffective position during movement away from said receptacle; and means actuated by a portion of said sludge-moving means, arranged to trip said latch means to release said member to an effective position, and to move said member toward said receptacle.

3. In a settling tank and the like, having means for moving the settled sludge therein, and a scum receptacle, the combination of a swinging scummer member, mounted for reciprocating movements to and from said receptacle; latch means arranged to maintain said scummer member in an ineffective position as it moves from said receptacle; means for moving said member from said receptacle; and means including a lost-motion connection actuated by a portion of said sludge-moving means, arranged to successively trip said latch means to release said member to an effective position, and to move the member toward said receptacle.

4. In a settling tank and the like having means for moving the settled sludge therein, and a scum receptacle, the combination of a carriage mounted for movements above the surface of the liquid in the tank to and from said receptacle; a latch member mounted on said carriage; a pivoted scummer member also mounted on said carriage, provided with a latch arm arranged to be brought into co-operative engagement with said latch member through swinging movement of said scummer member imparted thereto by engagement with a wall of said scum receptacle, whereby said scummer member will be maintained in an inoperative position during travel thereof from said receptacle; and means for moving said carriage and scummer member toward said receptacle, including a member positioned in the path of a portion of said sludge-moving means, and a member arranged to trip said latch member to release the scummer member to an operative position.

5. In a settling tank and the like, having means for moving the settled sludge therein, and a scum receptacle, the combination of spaced trackways in said tank; a pair of tandem carriage members mounted on each trackway for reciprocating movements to and from said receptacle, there being a lost motion connection between each pair of tandem carriages; a scummer member spanning the tank, pivotally mounted by an opposed pair of said carriages; means for moving said carriages away from said receptacle; means carried by certain of said carriages engageable by a portion of said sludge moving means, for moving said carriages toward said receptacle; and co-operating latch members carried by said carriages and said scummer member, arranged to engage through swinging movement of the scummer member as it passes a portion of the receptacle in one direction, and to thereby maintain said member in an ineffective position during its travel in said direction; the lost motion connection between the tandem carriages being arranged to trip said latch members when the direction of travel is reversed, and thereby release the scummer member to its effective position.

ROBERT T. STEINDORF.
ARTHUR C. LIND.